United States Patent
Horng et al.

(10) Patent No.: US 6,873,070 B2
(45) Date of Patent: Mar. 29, 2005

(54) ADJUSTING DEVICE FOR A STATOR FOR AN OPTICAL DISK DRIVE MOTOR

(75) Inventors: Alex Horng, Kaohsiung (TW); Tso-Kuo Yin, Kaohsiung Hsien (TW)

(73) Assignee: Sunonwealth Electric Machine Industry Co., Ltd., Kaohsiung (TW)

(*) Notice: Subject to any disclaimer, the term of this patent is extended or adjusted under 35 U.S.C. 154(b) by 93 days.

(21) Appl. No.: 10/309,265

(22) Filed: Dec. 4, 2002

(65) Prior Publication Data

US 2004/0108785 A1 Jun. 10, 2004

(51) Int. Cl.$^7$ .................................................. H02K 11/00
(52) U.S. Cl. ..................................... 310/67 R; 310/89
(58) Field of Search .............................. 310/67 R, 71, 310/89; 360/98.07, 99.08

(56) References Cited

U.S. PATENT DOCUMENTS 5,659,445 A * 8/1997 Yoshida et al. .......... 360/98.07
5,949,613 A * 9/1999 Moir et al. ............... 360/99.08
6,282,053 B1 * 8/2001 MacLeod et al. ........ 360/98.07

FOREIGN PATENT DOCUMENTS

JP          60022437 A  *  2/1985  ............ H02K/5/00

* cited by examiner

Primary Examiner—Thanh Lam
(74) Attorney, Agent, or Firm—Bacon & Thomas, PLLC

(57) ABSTRACT

An optical disk drive motor includes a stator and a main board. At least one adjusting member is provided between the stator and the main board. The adjusting member is adjustable to adjust a pressing force exerted on one of the stator and the main board, thereby keeping the stator and the main board in a parallel relationship.

8 Claims, 6 Drawing Sheets

ADJUSTING DEVICE FOR A STATOR FOR
AN OPTICAL DISK DRIVE MOTOR

BACKGROUND OF THE INVENTION

1. Field of the Invention

The present invention relates to an adjusting device for a stator for an optical disk drive motor.

2. Description of the Related Art

FIG. 1 of the drawings illustrates a conventional optical disk drive motor including a disk tray 10, a shaft 20, a rotor 30, and a stator 40. A holding means 11 is mounted on the disk tray 10 for holding an optical disk. The shaft 20 is connected to the disk tray 10 and the rotor 30. The stator 40 is fixed to an axle tube 41 and controlled by a main board (e.g., a circuit board 42) to create alternating magnetic fields for providing induction with a ring magnet 31 on the rotor 30, thereby turning the disk tray 10 and the optical disk.

Generally, the disk tray 10 would incline relative to the rotor 30 when the disk tray 10 is mounted onto the shaft 20. Namely, the disk tray 10 is apt to be located in a position not parallel to the rotor 30. To prevent unbalanced rotation of the optical disk drive motor and to decrease the bad product rate resulting from deviation of the disk tray 10, the disk tray 10 is subject to a grinding process to reduce the thickness of the disk tray 10 from "a" to "b", thereby keeping the surface of the disk tray 10 in a parallel relationship with the rotor 30. Though the grinding procedure could compensate the deviation of the disk tray 10, it could not compensate inclination of the stator 40 or the axle tube 41 relative to the circuit board 42. The inclination of the axle tube 41 may cause deviation of the shaft 20, disk tray 10, or rotor 30. Further, the balance state of the disk tray 10 must be repeatedly tested during the grinding procedure. As a result, the grinding procedure is considerably time-consuming. Further, the strength of the disk tray 10 and the rotational stability of the disk tray 10 could be destroyed by excessive grinding.

SUMMARY OF THE INVENTION

It is a primary object of the present invention to provide an adjusting device for a stator for an optical disk drive motor for providing a parallel relationship between the main board and the stator.

An optical disk drive motor in accordance with the present invention comprises a stator and a main board. At least one adjusting member is provided between the stator and the main board. The adjusting member is adjustable to adjust a pressing force exerted on one of the stator and the main board, thereby keeping the stator and the main board in a parallel relationship.

In a first embodiment of the invention, an optical disk drive motor includes a stator and a main board. The stator includes a plurality of screw holes spaced at regular angular intervals. A plurality of adjusting screws are provided and each has a first end engaged in an associated one of the screw holes of the stator and a second end pressing against the main board. Each adjusting screw is adjustable to adjust a pressing force exerted on the main board, thereby keeping the stator and the main board in a parallel relationship.

In a second embodiment of the invention, an optical disk drive motor includes a stator and a main board. The main board includes a plurality of screw holes spaced at regular angular intervals. A plurality of adjusting screws are provided and each has a first end engaged in an associated one of the screw holes of the main board and a second end pressing against the stator. Each adjusting screw is adjustable to adjust a pressing force exerted on the stator, thereby keeping the stator and the main board in a parallel relationship.

In a third embodiment of the invention, an optical disk drive motor includes a main board, an axle tube securely mounted on the main board, and a stator securely mounted around the axle tube. The axle tube includes a flange on an outer periphery thereof. The flange is spaced from the main board and includes a plurality of screw holes spaced at regular angular intervals. A plurality of adjusting screws are provided and each has a first end engaged in an associated one of the screw holes of the flange and a second end pressing against the main board. Each adjusting screw is adjustable to adjust a pressing force exerted on the main board, thereby keeping the stator and the main board in a parallel relationship.

In a fourth embodiment of the invention, an optical disk drive motor includes a main board, an axle tube securely mounted on the main board, and a stator securely mounted around the axle tube. The axle tube includes a flange on an outer periphery thereof, the flange being spaced from the main board. The main board includes a plurality of screw holes spaced at regular angular intervals. A plurality of adjusting screws are provided and each has a first end engaged in an associated one of the screw holes of the main board and a second end pressing against the flange. Each adjusting screw is adjustable to adjust a pressing force exerted on the flange, thereby keeping the stator and the main board in a parallel relationship.

Other objects, specific advantages, and novel features of the invention will become more apparent from the following detailed description and preferable embodiments when taken in conjunction with the accompanying drawings.

DETAILED DESCRIPTION OF THE PREFERRED EMBODIMENTS

Preferred embodiments in accordance with the present invention will now be described with reference to the accompanying drawings.

Figure 3:
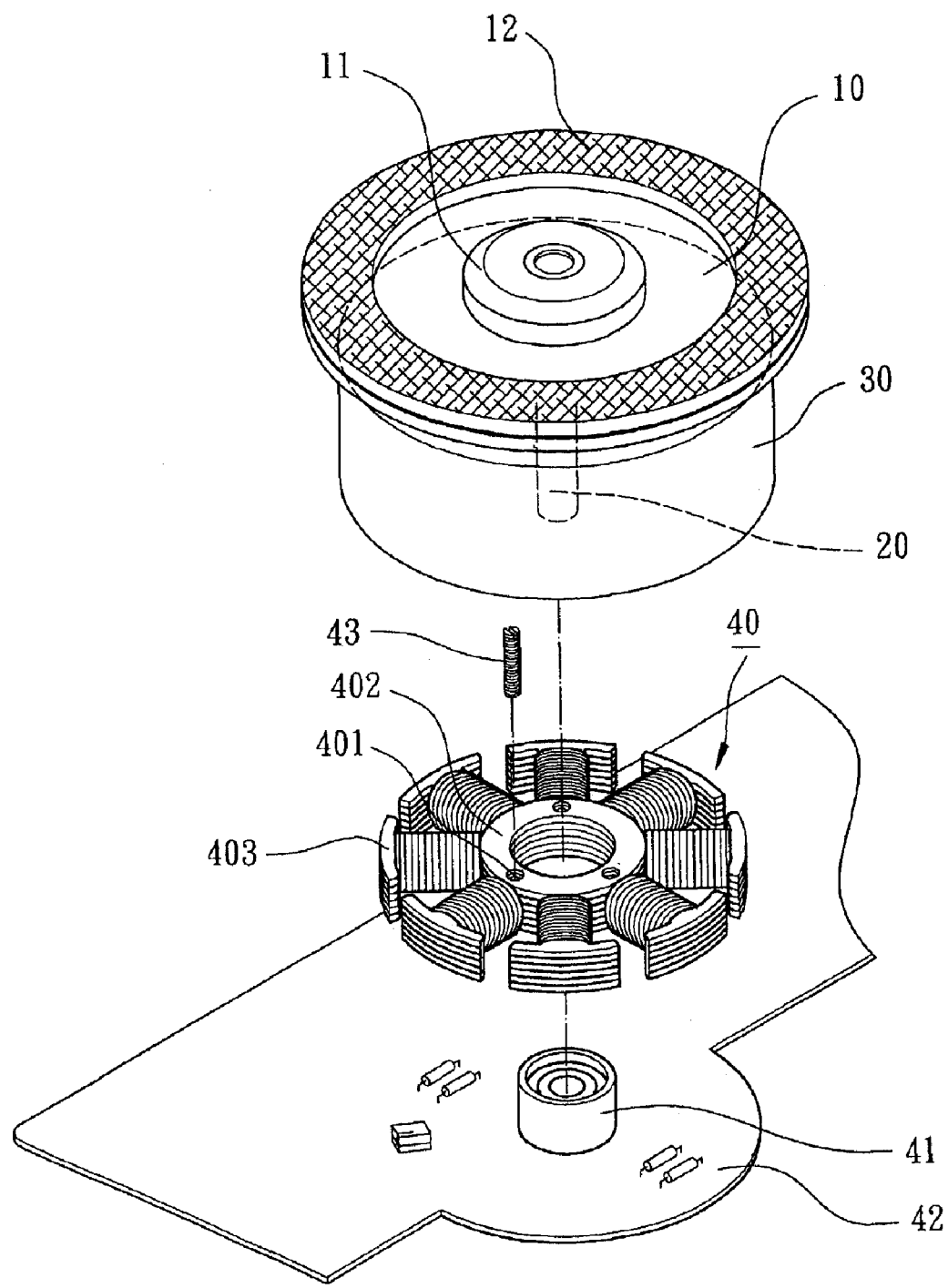
FIG. 3 is an exploded perspective view, partly cutaway, of a first embodiment of an optical disk drive motor in accordance with the present invention.
Figure 4:
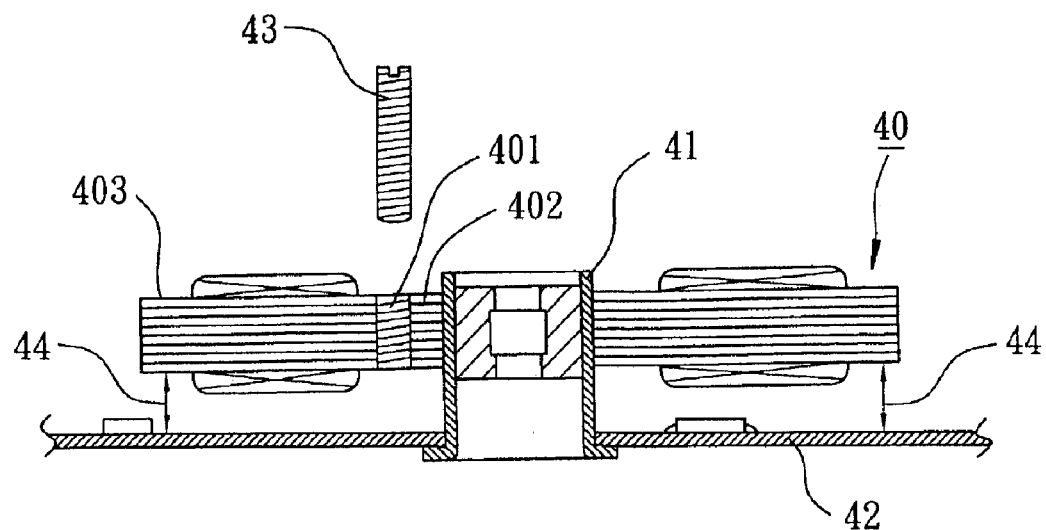
FIG. 4 is a sectional view of a stator and a main board of the optical disk drive motor in FIG. 3, illustrating adjustment of the position of the stator by an adjusting screw.
Figure 5:
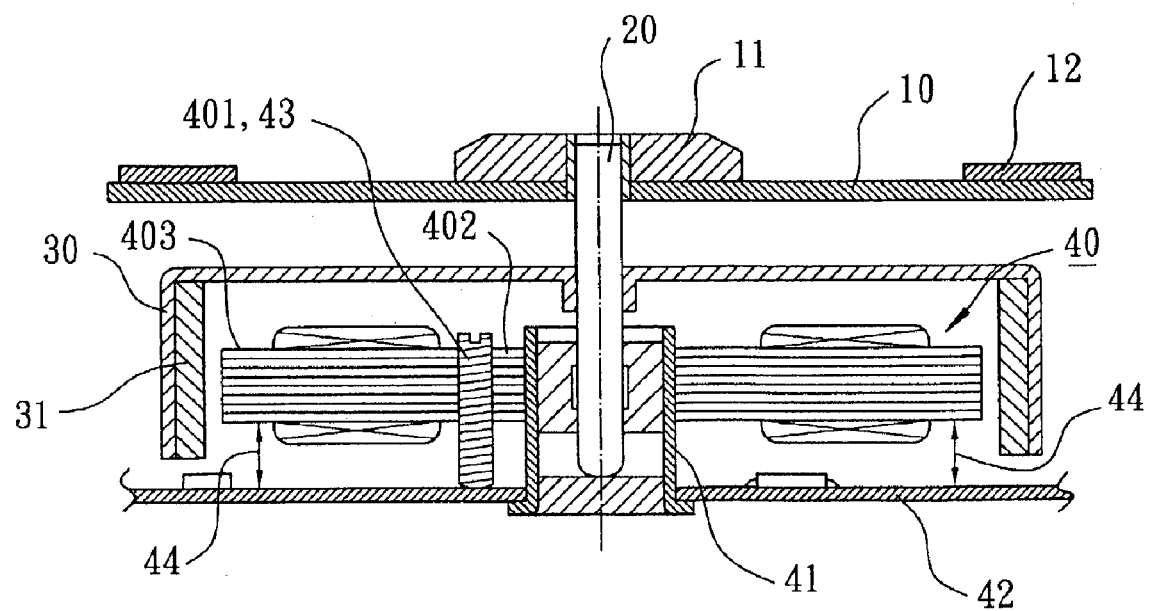
FIG. 5 is a sectional view of the optical disk drive motor in FIG. 3 after adjustment.

Referring to FIGS. 3 through 5, a first embodiment of an optical disk drive motor in accordance with the present invention generally includes a main board 42 (e.g., a circuit board) having an axle tube 41 mounted thereon, a stator 40 mounted around the axle tube 41, and a rotor 30 mounted around the stator 40. The rotor 30 includes a shaft 20 rotatably held in the axle tube 41. Further, the rotor 30 includes a ring magnet 31 attached thereto for induction with the stator 40. A disk tray 10 is mounted above the rotor 30 and includes a hole (not labeled) through which the shaft 20 of the rotor 30 extends. A holding means 11 is mounted on an upper side of the disk tray 10 and securely engaged with an upper end of the shaft 20 of the rotor 30. An optical disk (not shown) placed on the disk tray 10 is held in place by the holding means 11. Thus, the optical disk and the holding means 11 are turned jointly by the shaft 20 of the rotor 30. An anti-slide ring 12 may be mounted on top of the disk tray 10 to prevent undesired sliding motion of the optical disk.

Of more importance, the optical disk drive motor includes at least one adjusting member for adjusting the position of the stator 40 relative to the main board 42. In this embodiment, the stator 40 includes a plurality of screw holes 401 spaced at regular angular intervals and extending in a direction transverse to a general plane on which the stator 40 lies. An adjusting screw 43 is extended through each screw hole 401. As illustrated in FIG. 5, the adjusting screws 43 extend into a space 44 between the stator 40 and the main board 42. In use, the respective adjusting screw 43 is turned to adjust the pressing force exerted by a distal end of the respective adjusting screw 43 against the main board 42, best shown in FIGS. 4 and 5. Thus, the relative position between the stator 40 and the main board 42 is adjusted by means of turning the adjusting screws 43 until the stator 40 and the main board 42 are parallel to each other. The deviation of the stator 40 relative to the main board 42 can be easily compensated by means of turning one or more adjusting screws 43. After adjustment, the adjusting screws 43 can be fixed by means of welding, fusion, gluing, etc, depending on the material (e.g., metal, alloy, plastic) of the adjusting screws 43. Loosening of the adjusting screws 43 and re-deviation of the stator 40 are avoided. The screw holes 401 may be defined in a central portion 402 of the stator 40, as shown in FIGS. 3 through 5. Alternatively, the screw holes 401 may be defined in the poles 403 of the stator 40 without adversely affecting their function.

Figure 6:
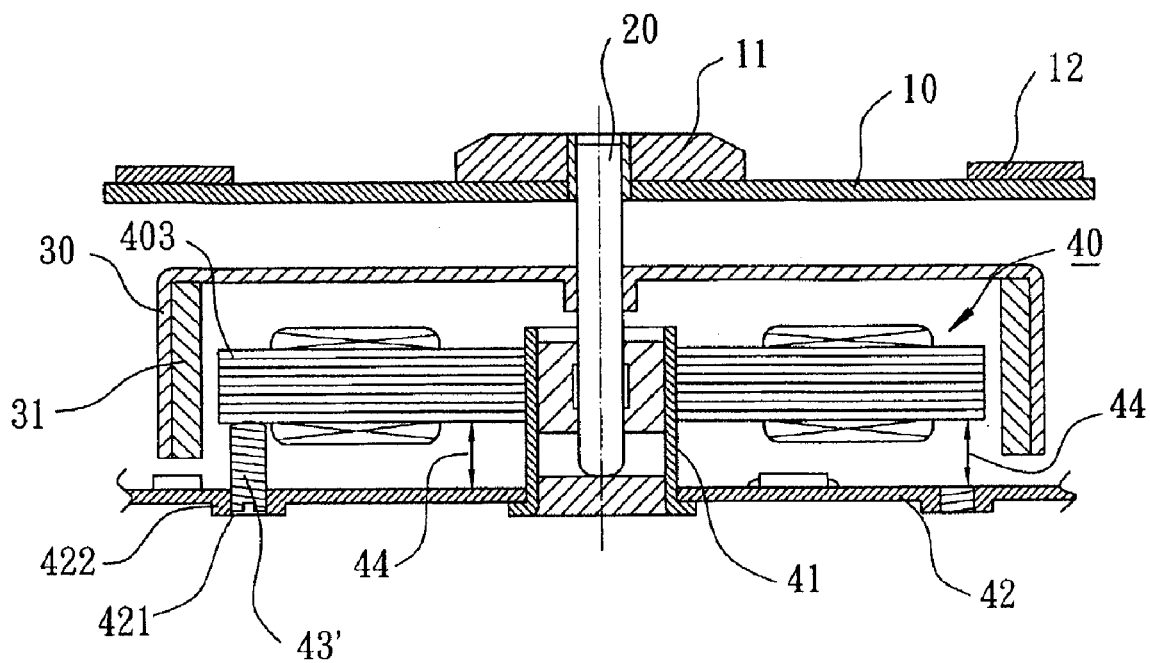
FIG. 6 is a sectional view of a second embodiment of the optical disk drive motor in accordance with the present invention.

FIG. 6 illustrates a second embodiment of the invention, wherein the screw holes (now designated by 421) are defined in the main board 42 instead of the stator 40. Each adjusting screw (now designated by 43') is extended through an associated screw hole 421 with a distal end of each adjusting screw 43' pressing against an underside of the stator 40. In use, the respective adjusting screw 43' is turned to adjust the pressing force exerted by a distal end of the respective adjusting screw 43' against the stator 40, best shown in FIG. 6. Thus, the relative position between the stator 40 and the main board 42 is adjusted by means of turning the adjusting screws 43' until the stator 40 and the main board 42 are parallel to each other. The deviation of the stator 40 relative to the main board 42 can be easily compensated by means of turning one or more adjusting screws 43'. A plurality of bosses 422 are formed on an upper side or an underside of the main board 42. Each boss 422 is located below or above an associated screw hole 421 and has a hole (not labeled) aligned with the associated screw hole 421 to thereby strengthen the structure of the main board 42. The screw hole 421 of the main board 42 can be selected to allow the adjusting screws 43' to press against a central portion 402 of the stator 40 or the poles 403 of the stator 40.

Figure 7:
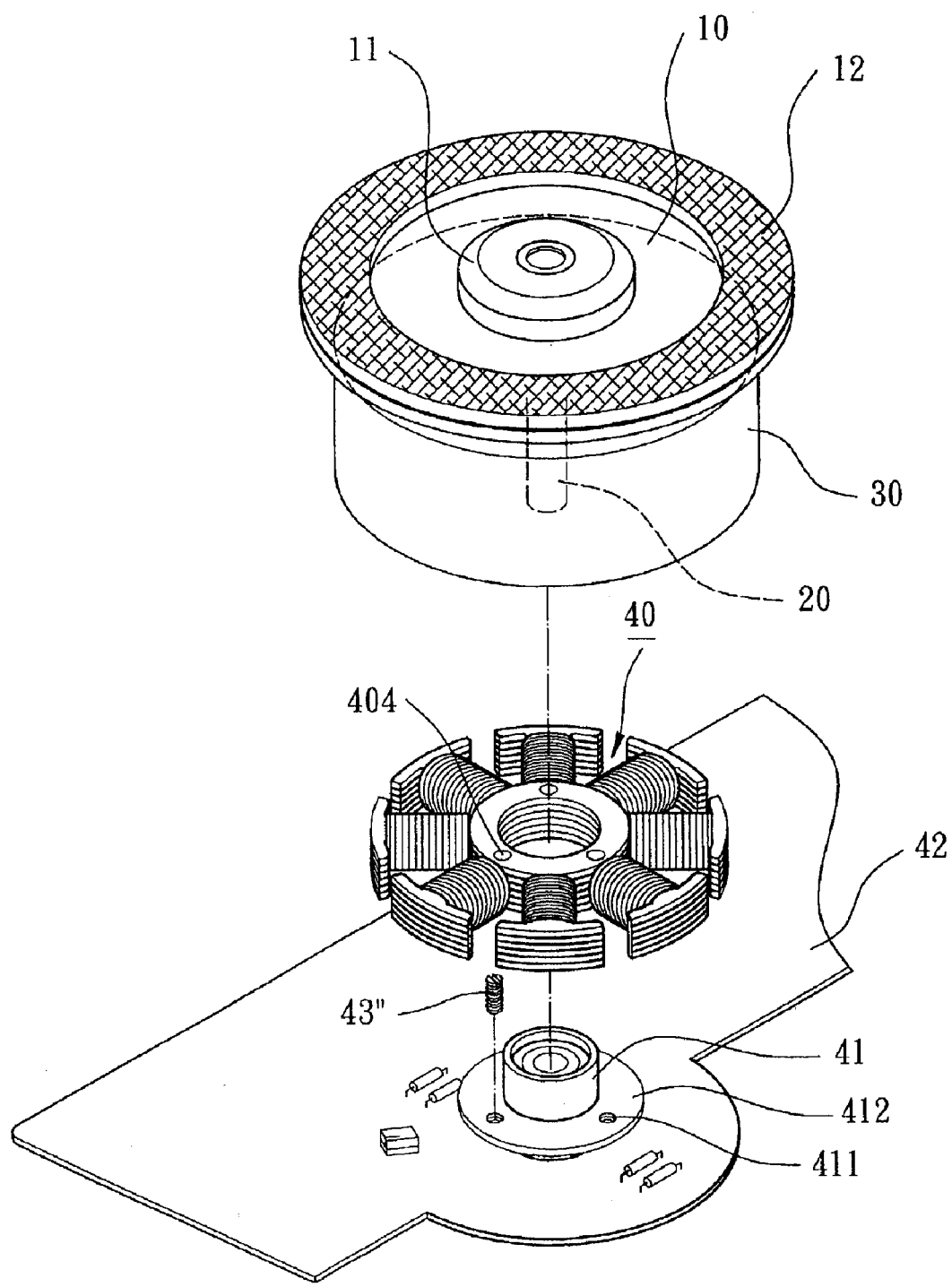
FIG. 7 is an exploded perspective view, partly cutaway, of a third embodiment of the optical disk drive motor in accordance with the present invention.
Figure 8:
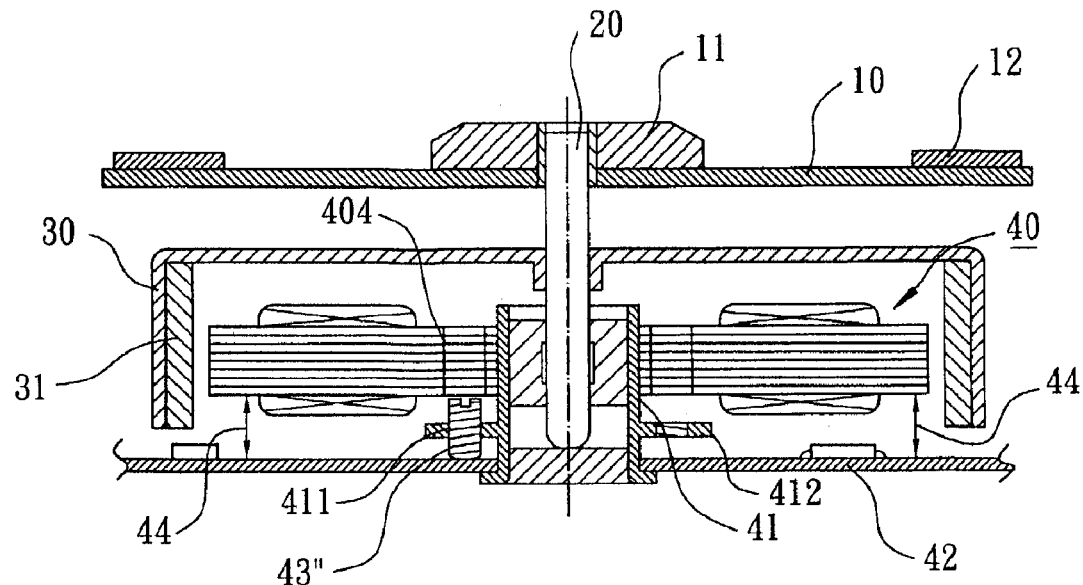
FIG. 8 is a sectional view of the optical disk drive motor in FIG. 7.

FIGS. 7 and 8 illustrate a third embodiment of the invention. In this embodiment, the axle tube 41 mounted on the main board 42 includes a flange 412 on an outer periphery thereof, the flange 412 being spaced from the main board 42. A plurality of screw holes 411 are defined in the flange 412 and spaced at regular angular intervals. An adjusting screw 43" is extended through each screw hole 401. As illustrated in FIG. 8, in use, the respective adjusting screw 43" is turned to adjust the pressing force exerted by a distal end of the respective adjusting screw 43" against the main board 42. Thus, the relative position between the stator 40 and the main board 42 is adjusted by means of turning the adjusting screws 43" until the stator 40 and the main board 42 are parallel to each other. The deviation of the stator 40 relative to the main board 42 can be easily compensated by means of turning one or more adjusting screws 43".

The stator 40 may include a plurality of through-holes 404 each of which is aligned with an associated screw hole 411 of the flange 412. Thus, a tool (not shown) may be inserted through the respective through-hole 404 to turn the respective adjusting screw 43". Although not specifically shown in FIGS. 7 and 8, a plurality of bosses may be formed on an upper side or an underside of the flange 412. Each boss is located below or above an associated screw hole 411 and has a hole (not labeled) aligned with the associated screw hole 411 to thereby strengthen the structure of the flange 412. Preferably, the flange 412 is integrally formed with the axle tube 41.

Figure 9:
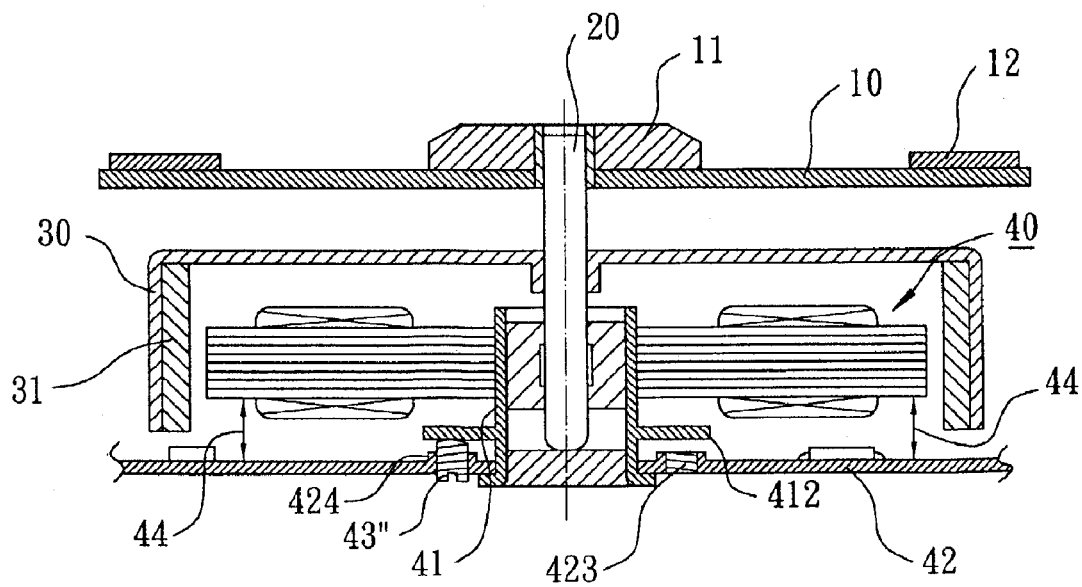
FIG. 9 is a sectional view of a fourth embodiment of the optical disk drive motor in accordance with the present invention.

FIG. 9 illustrates a fourth embodiment of the invention that is modified from the third embodiment, the screw holes (now designated by 423) are defined in the main board 42 instead of the flange 412 of the axle tube 41. Each adjusting screw 43" is extended through an associated screw hole 423 with a distal end of each adjusting screw 43" pressing against an underside of the flange 412. In use, the respective adjusting screw 43" is turned to adjust the pressing force exerted by a distal end of the respective adjusting screw 43" against the flange 412, best shown in FIG. 9. Thus, the relative position between the stator 40 and the main board 42 is adjusted by means of turning the adjusting screws 43' until the stator 40 and the main board 42 are parallel to each other. The deviation of the stator 40 relative to the main board 42 can be easily compensated by means of turning one or more adjusting screws 43". A plurality of bosses 424 are formed on an upper side or an underside of the main board 42. Each boss 424 is located below or above an associated screw hole 423 and has a hole (not labeled) aligned with the associated screw hole 423 to thereby strengthen the structure of the main board 42. Preferably, the flange 412 is integrally formed with the axle tube 41.

It is appreciated that the adjusting screws 43, 43", 43" and the screw holes 401, 411, 421, 423 can be replaced with other adjusting means without departing from the scope of the invention. Examples of the adjusting means include columns of different lengths, several elastic elements of different elastic coefficients, etc.

Figure 1:
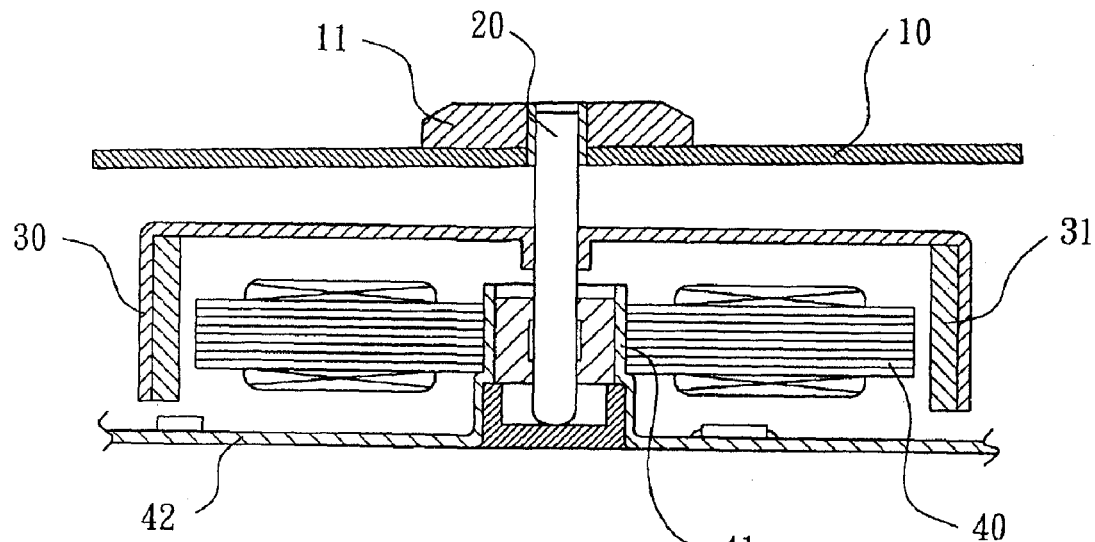
FIG. 1 is a sectional view of a conventional optical disk drive motor.
Figure 2:
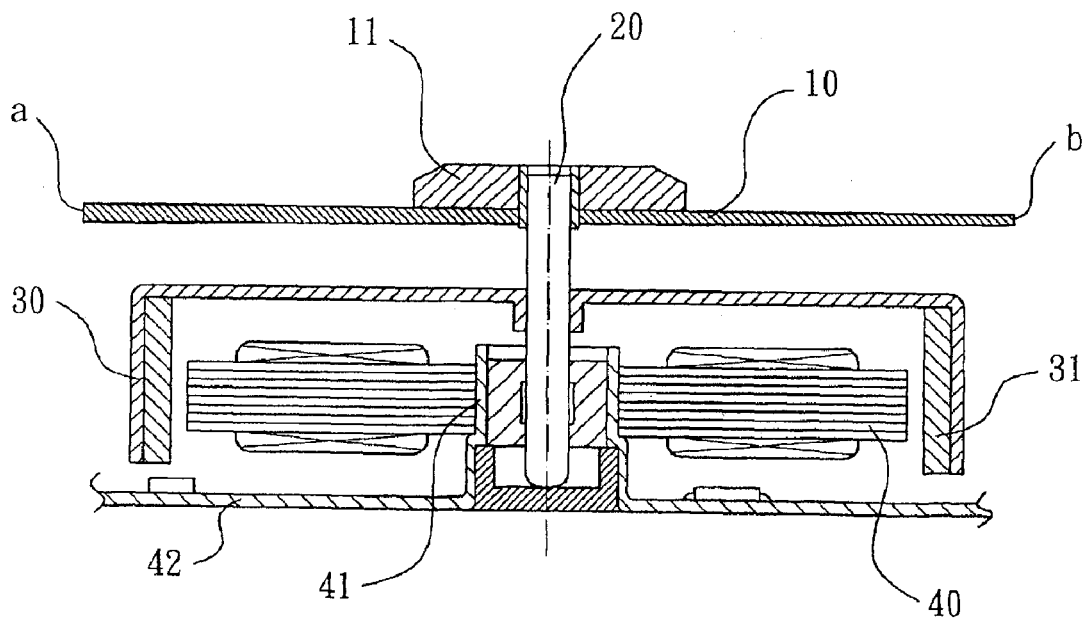
FIG. 2 is a sectional view similar to FIG. 1, illustrating compensation of deviation of a disk tray.

Compare FIG. 1 with FIG. 3, by means of providing the adjusting members (adjusting screws 43, 43', 43") and the screw holes 401, 411, 421, 423 to adjust the pressing forces provided by the adjusting members, the stator 40 and the main board 42 can be parallel each other to compensate the deviation of the stator 40 relative to the main board 42. The damage of the disk tray 10 resulting from excessive grinding and the time-consuming processing of the disk tray 10 in the prior art are avoided. The prior art grinding procedure of the disk tray 10 also fails to provide compensation in the deviation of the stator 40 relative to the main board 42.

Conclusively, the stator 40 and the main board 42 of the optical disk drive motor in accordance with the present invention are adjusted to be in parallel relationship with each other under non-destructive means. The adjusting procedure is simple and easy and can be accomplished in a relatively short time.

Although the invention has been explained in relation to its preferred embodiments as mentioned above, it is to be understood that many other possible modifications and variations can be made without departing from the scope of the invention. It is, therefore, contemplated that the appended claims will cover such modifications and variations that fall within the true scope of the invention.

What is claimed is:

1. An optical disk drive motor comprising:

a stator and a main board, the stator comprising at least one screw hole, at least one adjusting member comprising an adjusting screw being provided between the stator and the main board, the at least one screw hole of the stator adapted to receive said adjusting member and provided with at least one boss formed on one end opening of said at least one screw hole so that said boss is able to guide said adjusting member such that said stator and said main board are parallel to each other during adjustment, and said at least one adjusting member being adjustable to adjust a pressing force exerted on one of the stator and the main board, thereby keeping the stator and the main board in a parallel relationship with each other.

2. The optical disk drive motor as claimed in claim 1, wherein said at least one adjusting member is fixed by one of welding, melting, and gluing when the stator and the main board are parallel to each other.

3. The optical disk drive motor as claimed in claim 1, wherein the stator includes at least one screw hole for engaging an end of said at least one adjusting screw.

4. The optical disk drive motor as claimed in claim 3, wherein said at least one screw hole is defined in a central portion of the stator.

5. The optical disk drive motor as claimed in claim 3, wherein said at least one screw hole is defined in at least one of a plurality of poles of the stator.

6. The optical disk drive motor as claimed in claim 3, wherein the stator further includes at least one boss formed on one of an upper side and an underside thereof, said at least one boss having a hole aligned with said at least one screw hole.

7. An optical disk drive motor comprising:

a stator and a main board, the stator including a plurality of screw holes and a plurality of bosses thereof spaced at regular angular intervals, a plurality of adjusting screws each having a first end engaged in an associated one of the screw holes of the stator and a second end pressing against the main board, said bosses are able to guide said adjusting screws so that said stator and said main board are parallel to each other during adjustment, and each said adjusting screw being adjustable to adjust a pressing force exerted on the main board, thereby keeping the stator and the main board in a parallel relationship with each other.

8. The optical disk drive motor as claimed in claim 7, wherein the screw holes are defined in a central portion of the stator.

* * * * *